Jan. 13, 1970     E. J. MICHAEL, JR., ET AL     3,489,171
HIGH VACUUM VALVE WITH DEFORMABLE GOLD SEAT RING
Filed Dec. 15, 1966     2 Sheets-Sheet 1

Earl J. Michael, Jr.
Robert J. Yinger
INVENTOR

BY
*Thomas E. Sterling*
ATTORNEY

Earl J. Michael, Jr.
Robert J. Yinger
INVENTOR

BY
Thomas E. Sterling
ATTORNEY

United States Patent Office 3,489,171
Patented Jan. 13, 1970

3,489,171
HIGH VACUUM VALVE WITH DEFORMABLE GOLD SEAT RING
Earl J. Michael, Jr., State College, and Robert J. Yinger, Boalsburg, Pa., assignors to Nuclide Corporation, State College, Pa., a corporation of Nevada
Filed Dec. 15, 1966, Ser. No. 601,924
Int. Cl. F16k 1/26
U.S. Cl. 137—556        5 Claims

ABSTRACT OF THE DISCLOSURE

This invention is directed to a high vacuum valve having a hemispherical shaped valve nose which seals against a replaceable gold ring seat located in a V-shaped groove.
This invention relates to valves and more particularly to valves intended to control the flow of fluids under considerable vacuum.

---

The present demands of high vacuums systems such as mass spectrometers, evaporators, melting furnaces and simulation chambers require specialized high vacuum valves which must operate easily, have little or no maintenance over long periods of time and be fabricated of a material which will not "out gas" or give off gaseous substances during high vacuum. Very frequently it is necessary that such valves be abe to withstand bake out temperatures of from 400 to 450° C. over long periods of time so that all gaseous substances contained within the material of the valve are dissipated. At the same time such valves must be able to withhold over long periods of time vacuum of $10^{-8}$ torr or better against atmosphere. In the area of mass spectrometry and other analytical techniques in employing high vacuums, it is essential that the material of the valve not give off gaseous substances during use which might interfere with the ultimate analysis, hence a high temperature baking to ensure the "out gas" is necessary. In addition, such valves used in high vacuum work should be able to withstand repeated closings without leaks and should be constructed of non-magnetic material. It can be readily seen that many of the conventional valving systems would not be adequate for use under such conditions and that the particular valve employed would be quite specialized.

This invention provides for a self seating valve, the seat of which is comprised of a gold ring positioned on a circular re-entrant groove located at the valve throat. A spherical valve nose is forced against the ring of the valve causing deformation of the ring to correspond to the spherical shape of the nose, hence seating the valve. The pressure of the valve nose forces the malleable gold ring into the re-entrant groove, thus fixing it in place. After the valve has been seated it will withstand innumerable openings and closings without failing. Should the gold ring ultimately wear out, it may be easily replaced.

It is therefore an object of this invention to provide a self seating valve which will withstand ultra high vacuum.

It is another object of this invention to provide a high vacuum valve which will withstand extended periods of high temperature baking.

It is still another object of this invention to provide a high vacuum valve which is not attacked by corrosive atmosphere.

It is still another object of this invention to provide a high vacuum valve the sealing portion of which is easily removable and easily replaced.

It is yet another object of this invention to provide a high vacuum valving system in which the sealing is accomplished by metal alone.

These and other objects of this invention may be had by referring to the following description and claims, taken in conjunction with the accompanying drawing in which:

Figure 3:
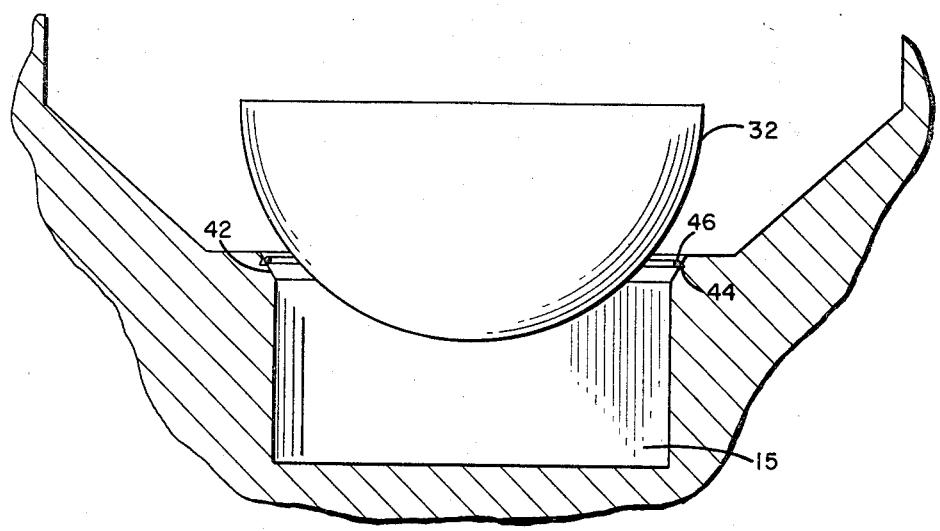
FIGURE 3 is an enlarged area of the sealing section of the valve of FIGURES 1 and 2 showing the gold wire ring unseated upon the re-entrant groove.
Figure 1:
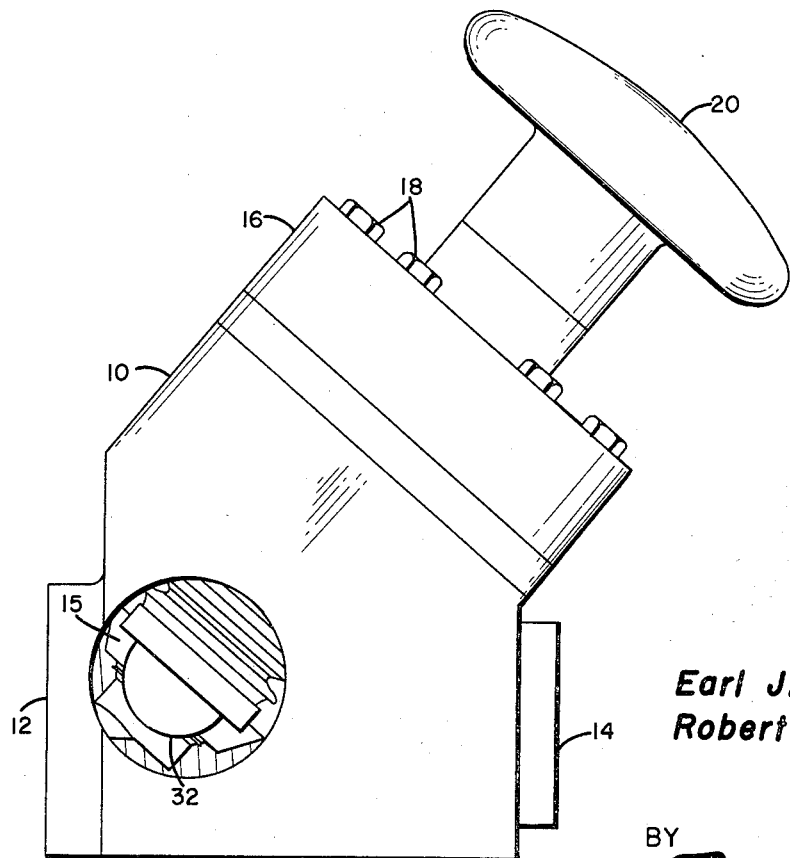
FIGURE 1 shows a valve construction embodying the invention, partly in elevation and partly in section.
Figure 4:
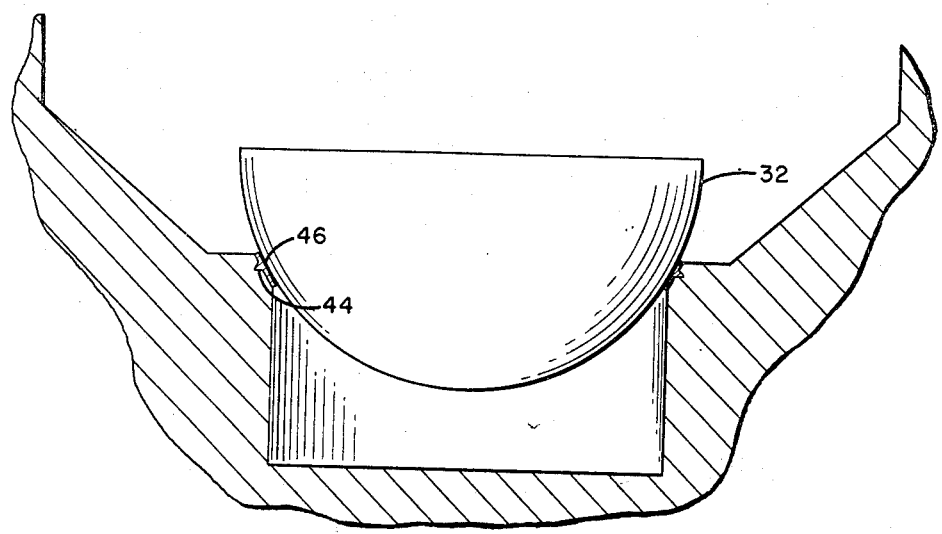
FIGURE 4 is an enlarged area of the sealing section of FIGURE 3 showing the wire ring of the valve in the seated position.
Figure 2:
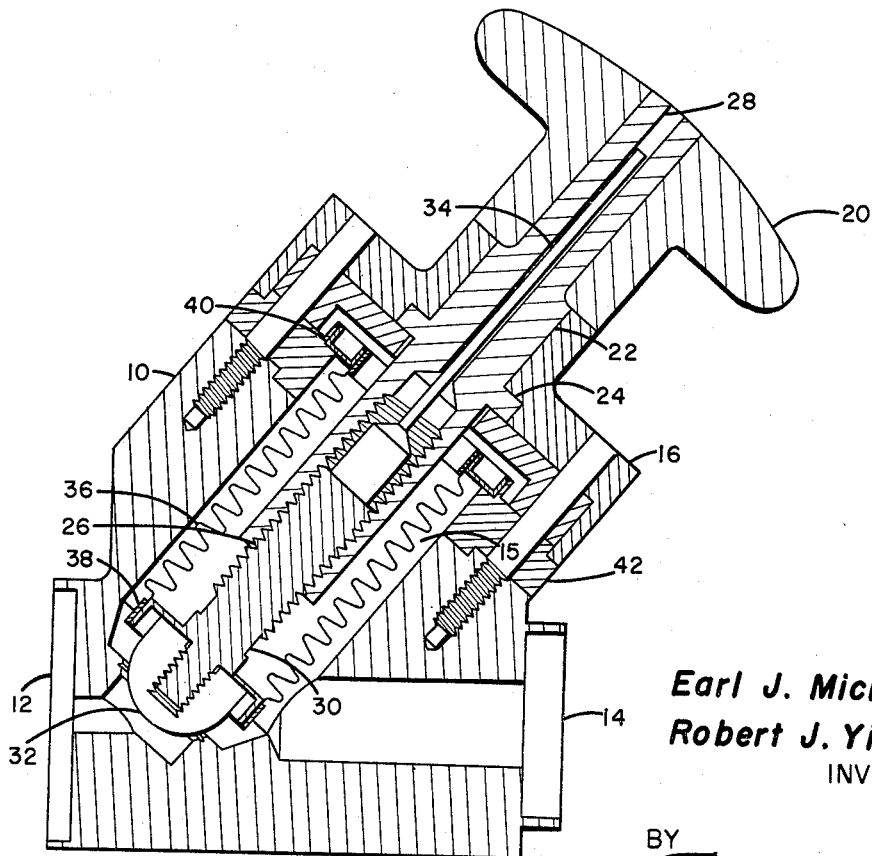
FIGURE 2 is a cross-sectional view of the valve of FIGURE 1.

Referring now to FIGURES 1 and 2, item 10 represents a valve body having intercommunicating entrance port 12, exit port 14, and valve receiving opening therein. Valve cap 16 is secured to valve body 10 by means of bolts 18 which extend through valve cap 16 into valve body 10 where they are screwably attached. Handle 20 is attached to valve driver 22 which extends through valve cap 16 into valve receiving opening 15. Valve driver 22 is a cylindrical shape having outwardly extending flanges 24 which engage the inner portion of valve cap 16, and contains a large diameter cylindrical bore 28 extending through the handle portion valve driver 22. A cylindrical valve rod 30 extends within and is screwably attached to large diameter cylindrical bore 26 at one end portion and at the other end portion is screwably attached to a hemispherical valve nose 32. Thus when valve handle 20 and valve driver 22 are rotated valve rod 30 will cause valve nose 32 to adance or retract within valve receiving opening 15, while flange 24 transmits thrust to valve cap 16 and to valve body 10.

A cylindrical indicator pin 34, having a large diameter end portion, extends from the interior end portion of valve rod 30 within large diameter cylindrical bore 26 through small diameter cylindrical bore 28 to outside of the valve. Thus when the handle 20 and valve driver 22 are screwed so that valve nose 32 is retracted from valve receiving opening 15, indicator pin 34 will extend outside of the end portion of small diameter cylindrical bore 28 and indicate that the valve is open. A cylindrical bellows 36 is attached to the inner most periphery of vave rod 30 where it is held in an air tight seal by means of a weldment to cylindrical sealing ring 38. Cylindrical bellows 36 extends within valve receiving opening 15 to flange 42 where it is welded to valve driver sealing rings 40 in an air tight seal. Thus valve nose 32 may be moved in and out of valve receiving opening 15 followed by the expansion or collapse of the flexible bellows 36. Valve rod 30, valve driver 22, and the outer portion of valve receiving opening 15 are thus air sealed from inner portion of valve receiving opening 15.

The interior end portion of valve receiving opening 15 terminates at a conically tapered seat 42 which is in communication with entrance port 12 and exit port 14. The conical seat 42 has a V-shaped cylindrical reentrant groove 44 cut therein to a depth of approximately 0.010 in. A gold wire-ring 46 fits upon the reentrant groove 44.

To initially seat the gold ring, handle 20 is turned, turning valve driver 22 thus causing valve rod 30, which is threadably connected to the large diameter cylindrical bore 26 to advance forward forcing hemispherical valve nose 32 to press the gold wire-ring 46 against tapered seat 42. The pressure of valve nose 32 upon gold wire-ring 46 causes the wire-ring 46 to deform and forces a portion of its within reentrant groove 44 where it is securely held. A portion of gold wire-ring 46 is pressed on the outer surface of tapered seat 42 causing the wire-ring to assume the shape of hemispherical valve nose 32, and thus producing a very effective sealing surface.

When handle 20 is rotated in the opposite direction, valve nose 32 will be withdrawn from gold wire-ring 46, but the wire-ring 46 will be held by reentrant groove 44 against tapered seat 42. The flexible bellows 36 will advance or retract with the movement of valve nose 32 and at the same time will seal internal portions of the valve from interconnecting with entrance port 12 and exit port 14.

The valve may then be hand opened and closed more than 2000 times without failing and will withstand bake out temperatures from 400 to 450° centigrade for long periods of time for the removal of gaseous substances contained in the valve. In addition, the valve will withstand over long periods of time very high vacuums of $10^{-8}$ torr, or better against atmosphere. When the gold wire-ring finally wears out, it may be easily replaced by simply disassembling the valve, removing the old wire-ring and inserting a new one.

What is claimed is:
1. A valve adapted to contain high intensity vacuum, comprising in combination:
   a tapered valve seat having a V-shaped reentrant groove positioned circumferentially therein;
   a replaceable gold ring positioned in retaining contact in said reentrant groove;
   a readily removable and replaceable hemispherical valve nose positioned in sealing contact with said gold ring so as to cause said ring to assume the surface configuration of said valve nose;
   means to advance and retract said valve nose to and from contact with said ring;
   whereby a vacuum seal is established between said valve nose and said ring.
2. The combination as claimed in claim 1 in which said means to advance and retract said valve nose is comprised of, in combination:
   a valve body member;
   a valve moving member, screwably attached to said valve body member, the inner end portion of said valve moving member being attached to said valve nose;
   whereby rotation of said valve moving member causes the advance or retraction of said valve moving member with said valve body member.
3. The combination as claimed in claim 2 having a sealing means adapted to seal the interior valve body member from the outside thereof.
4. The combination as claimed in claim 3 in which said sealing means is comprised of in combination a flexible bellows one end of which is attached to said valve nose, and the other end of which is attached to said valve body member in sealing relationship.
5. The combination is claimed in claim 4 having an indicator member positioned in contact with said valve moving member and extending without said valve body member, adapted to indicate the position of said valve.

References Cited

UNITED STATES PATENTS

| 1,526,248 | 2/1925 | Small | 251—333 X |
| 1,929,973 | 10/1933 | Haley | 137—556 |
| 2,903,564 | 9/1959 | Carr | 251—368 X |
| 3,160,391 | 12/1964 | Medicus et al. | 251—333 X |
| 3,168,282 | 2/1965 | Latshaw et al. | 251—333 |

FOREIGN PATENTS 709,364  5/1931  France.

ARNOLD ROSENTHAL, Primary Examiner

U.S. Cl. X.R.

251—333, 365, 368